May 13, 1958 B. O. DAVIDS 2,834,437
AUTOMATIC BRAKE APPLICATOR
Filed Aug. 22, 1956 2 Sheets-Sheet 1
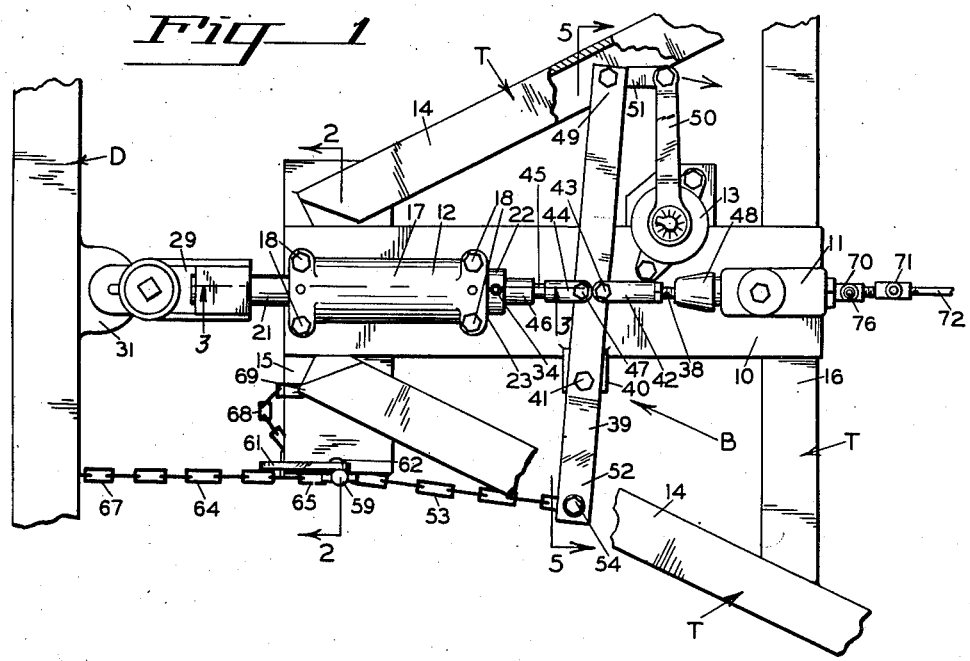
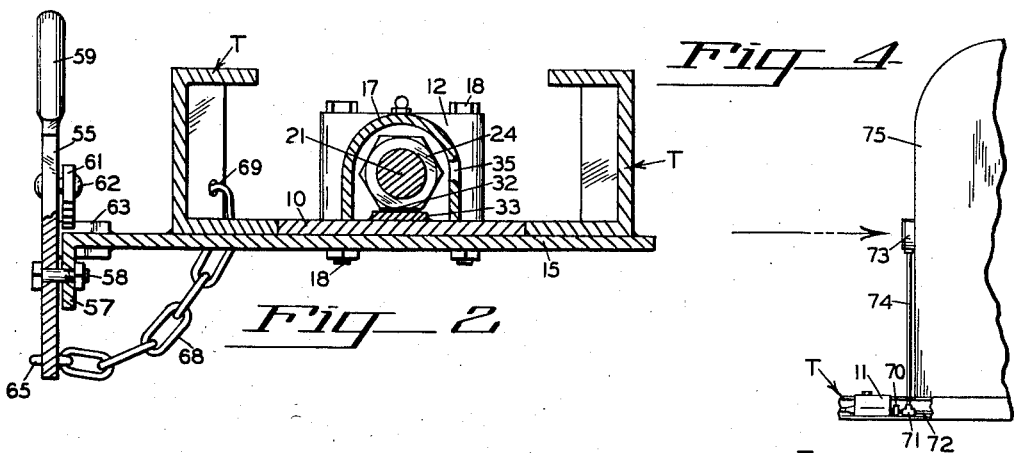
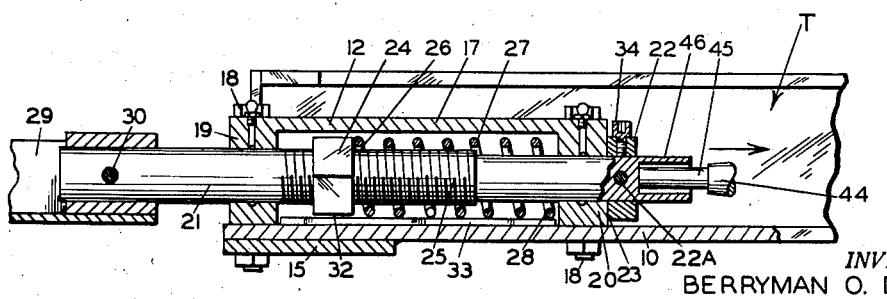
INVENTOR.
BERRYMAN O. DAVIDS
BY
Kimmel & Crowell
ATTORNEYS

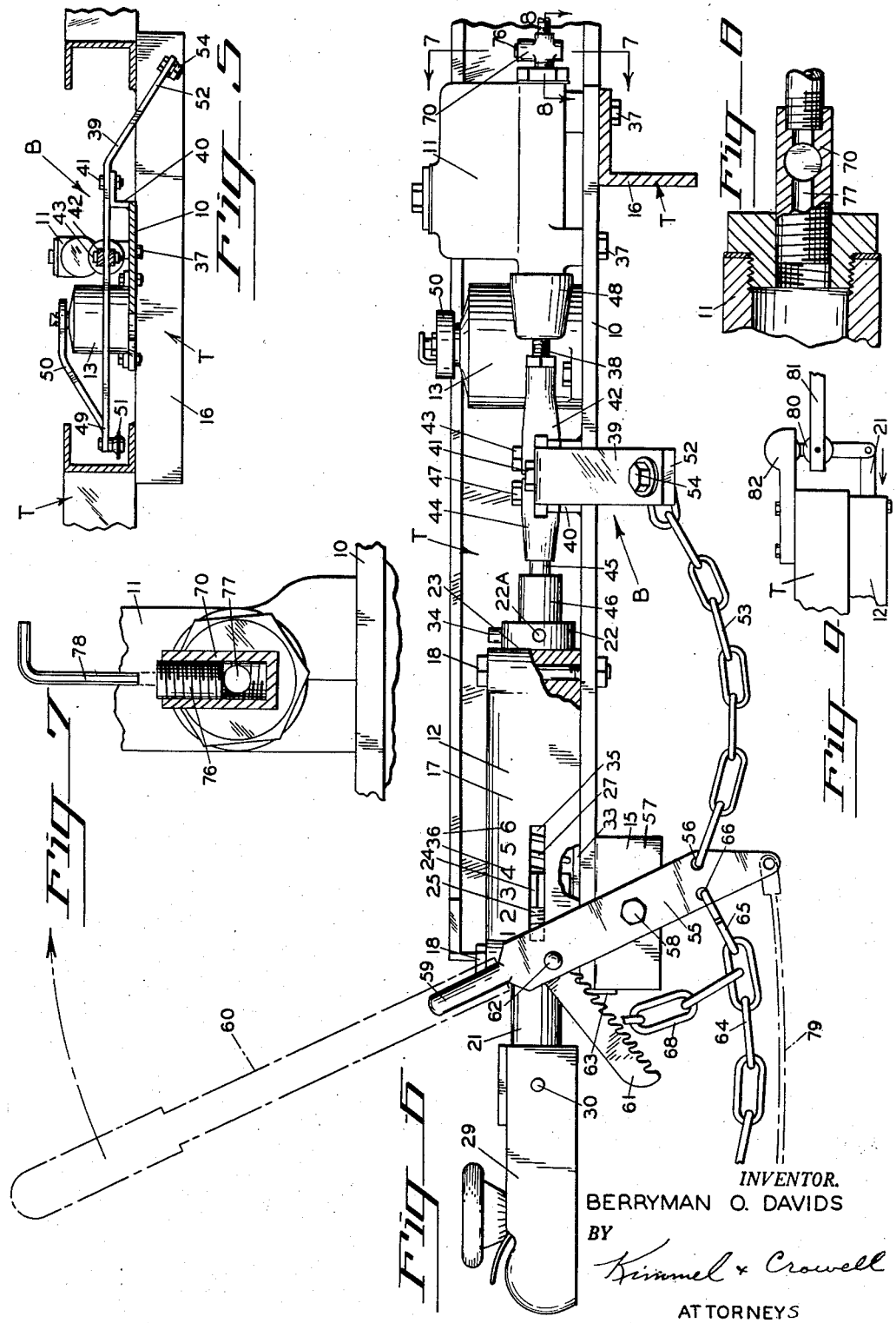

United States Patent Office 2,834,437
Patented May 13, 1958

2,834,437
AUTOMATIC BRAKE APPLICATOR
Berryman O. Davids, Longview, Wash.

Application August 22, 1956, Serial No. 605,504

5 Claims. (Cl. 188—112)

This invention relates to an automatic brake applicator, which is particularly adapted for the application of trailer brakes, and a further improvement on my now pending application for Automatic Brake Applicator, Serial No. 547,910 filed November 21, 1955.

The primary object of this improved invention for trailer brakes is to provide a stabilizing mechanism for eliminating oscillating longitudinal movements between the tractor and the trailer when the brakes are suddenly applied.

Heretofore, when the brakes were suddenly applied to the trailer, an oscillating movement developed between the trailer and the tractor causing many serious accidents due to buckling or jack-knifing between the trailer and the tractor.

With this new and improved automatic brake applicator, the momentum of the trailer applies the brakes to the trailer when the tractor is slowed down by its brakes, but with the improvements incorporated within this invention the brakes are applied to the trailer smoothly. Means are provided within the brake applicator for preventing forward and backward movement between the trailer and the tractor when the brakes are applied.

In order to accomplish the above result, a shock absorbing device is used in connection with the applicator for preventing the development of this forward and backward oscillating movement.

Other objects and advantages will become apparent in the following specification when considered in the light of the attached drawings, in which:

Figure 1 is a fragmentary plan view of my improved automatic brake applicator, showing the forward end of the tongue of a trailer and the rear draw bar of a tractor vehicle associated therewith, parts broken away for convenience of illustration.

Figure 2 is an enlarged transverse sectional view, taken on the line 2—2 of Figure 1, looking in the direction of the arrows.

Figure 3 is an enlarged fragmentary longitudinal sectional view, taken on the line 3—3 of Figure 1, looking in the direction indicated, parts broken away for convenience of illustration.

Figure 4 is a fragmentary side elevation of the forward end of the trailer, illustrating how a pressure indicating gauge is used for indicating to the driver the pressure of the brake fluid of the tractor vehicle.

Figure 5 is a fragmentary transverse sectional view, taken on the line 5—5 of Figure 1, looking in the direction indicated.

Figure 6 is an enlarged fragmentary side elevation of the applicator mechanism, with the near side of the tongue of the trailer being completely removed therefrom, and other parts broken away for convenience of illustration.

Figure 7 is an enlarged fragmentary transverse sectional view, taken on the line 7—7 of Figure 6, looking in the direction indicated.

Figure 8 is an enlarged fragmentary horizontal sectional view, taken on the line 8—8 of Figure 6, looking in the direction indicated.

Figure 9 is a modified form of coupling assembly used in connection with this new and improved trailer brake applicator.

Referring now to the drawings in detail wherein like reference numerals indicate like parts throughout the several figures, the reference character T indicates generally a trailer tongue while the draw bar of the tractor vehicle is indicated by D, and the brake applicator is indicated by the letter B.

The brake applicator B consists of a base 10 upon which is mounted a master hydraulic brake cylinder pump 11, a trailer hitch connecting tongue assembly 12, and a shock absorber 13.

The base 10 of the brake assembly B is fixedly secured to the cross bars 15 and 16, preferably by welding, which are in turn welded to the tongue members 14. The trailer hitch tongue assembly 12 consists of an elongated hollow cylindrical body 17, which is preferably bolted to the base 10 by bolts 18. Referring particularly to Figures 2 and 3, slidably mounted within bearings 19 and 20 of the body member 17 is a plunger 21. A collar or shoulder 22 is mounted on one end of the plunger 21 and is adapted to contact the end 23 of the bearing 20, limiting the movement of the plunger 21 in one direction.

A nut or collar 24 is threaded by threads 25 to the plunger 21. The nut or collar 24 is adapted to bear against an end 26 of a spring 27. The opposite end of the spring 27 is adapted to bear against the inner end 28 of the bearing 20. The spring 27 forces the plunger 21 to the left, as viewed in Figure 3, against the collar 22 under normal conditions.

A standard trailer hitch or coupler 29 is removably fixed to the end of the plunger 21 by a cross pin 30. The coupler 29 is interchangeable so as to adapt the invention to various sized trailer hitches. The coupler 29 is adapted to connect to the draw bar D of the tractor vehicle engaging the usual ball fitting 31. The pull of the tractor vehicle is applied to the plunger 21 pulling the collar 22 against the end of the body member 17, which in turn pulls the trailer. In the event the brake of the tractor vehicle is applied, the weight of the trailer will tend to come forward, compressing the spring 27. This complete operation will be later described.

The nut or collar 24 is prevented from turning by having one of its sides 32 engaging the raised portion 33 of the base 10. In order to increase or decrease the tension of the spring 27, the trailer coupler 29 is removed from the draw bar D, allowing the operator to revolve the plunger 21 in either direction, causing the thread 25 of the plunger 21 to move the nut 24 in either direction, increasing or decreasing the tension on the spring 27. When the proper adjustment has been made, the stud bolt 34 is threaded into the collar 22 by a special wrench so that the plunger 21 cannot be rotated by anyone unauthorized to do so, due to the fact that the head of the stud bolt 34 will engage the upper surface of the base 10, preventing the plunger 21 from being revolved.

The tension developed within the spring 27 is indicated to the operator through the slot 35 by the position of the nut 24 in relation to the indicating indicia 36. The heavier the trailer the greater the tension required within the spring 27, and vice versa.

The master brake cylinder pump 11 is of a standard conventional type and is bolted to the base 10 by stud bolts 37. A piston plunger 38 of the brake cylinder 11 is operated in the following manner. An actuating bar 39 is pivotally mounted to the base by the bracket 40 at 41. An adjustable clevice 42 connects the brake plunger 38 to the bar 39 at 43.

Disposed oppositely from the clevice 42 is another clevice 44, which has a plunger 45 forming part thereof and extending into the socket 46 of the inner end of the plunger 21, referring to Figure 3. The clevice 44 is pivotally connected at 47 to the actuating lever 39. The plunger 45 has freedom of side movement within the socket 46 and also the plunger 38 has freedom of angular movement within the housing 48 of the master cylinder pump 11. This allows for the radial action of the actuating lever 39 between its pivot 41 and where the clevices 42 and 44 connect thereto.

The end 49 of the actuating lever 39 is connected to the arm 50 of the hydraulic shock absorber 13 by a link 51, the operation of which will be later described. The opposite end 52 of the actuating lever 39 has a chain 53 providing a flexible connection extending to the bore 56 in the lever 55. The lever 55 is pivotally connected to a bracket end 57 of the cross bar 15 at 58 and extends beyond the pivot 58 in a reduced portion 59.

The reduced portion 59 is adapted to receive a hand operated lever 60, indicated by broken lines in Figure 6. A ratchet pawl 61 is pivotally connected at 62 to the lever 55 and is adapted to engage the dog 63 forming part of the bracket 57, the action of which will be described later on.

A chain 64 has one end 65 connected to the lever 55 at 66. Its opposite end 67 is adapted to be connected to the tractor vehicle, as indicated in Figure 1. A chain 68 is connected at one end to the chain 64 adjacent its one end, and at its other end to the trailer tongue T at 69, referring to Figure 2. The chains 64 and 68 act as a safety coupling chain, as well as providing means for applying the brakes on the trailer in the event the coupler 29 should become disconnected, which will be described more fully later on.

Referring to Figures 1, 4, 6, 7 and 8, the fluid pressure delivered from the master brake cylinder 11 passes through a shut off valve 70 into the T fitting 71 and to the brakes of the trailer through the pipe 72. The fluid also leaves the T 71 and is delivered to the pressure gauge 73 through piping 74 located on the front of the trailer 75. The pressure gauge can be read by the driver from the tractor.

The shut off valve 70 includes a threaded valve plug 76, which is adapted to shut off the opening 77 through the valve 70 when it is desired to park the trailer with the trailer brakes applied. The plug 76 can only be operated by a special wrench 78.

In some cases in the use of this new and improved trailer brake applicator it is desirable to apply the brakes of the trailer directly from the tractor vehicle independent from the brakes of the tractor. This is accomplished by providing the brake cable indicated by broken lines 79, Figure 6. This cable may be connected to the manually operated emergency brake system of the tractor vehicle.

The mode of operation of this new and improved automatic brake applicator will now be described. The tension on the spring 27 is adjusted in accordance with the weight of the trailer and its load by adjusting the nut or collar 24 along the threaded portion 25 of the plunger 21, as above described. The trailer coupler 29 is applied to the ball member 31 of the draw bar D of the tractor, and the safety chain 64 secured to the tractor at any suitable anchorage, as at 67, referring to Figure 1.

When the brakes of the tractor vehicle are applied, the momentum of the trailer compresses the spring 27 allowing the plunger 21 to move within its bearings 19 and 20 in the direction of the arrow, referring to Figure 3. This will move the plunger 45, pivoting the actuating lever 39 about its center 41, in the direction of the arrow, moving the piston plunger 38 of the master cylinder pump 11 with the same, operating the piston within the master cylinder pump 11 so as to apply hydraulic pressure from the master cylinder pump 11 into the trailer brake line 72 and into the gauge 73 through the line 74.

At the same time this action takes place, the end 49 of the actuating lever 39 moves the arm 50 of the shock absorber 13 in the direction of the arrow. A predetermined resistance or damping action is offered to this movement by the shock absorber 13 so that too sudden an application of the brakes is prevented. When the brakes of the tractor vehicle are released the plunger 38 of the master cylinder pump 11 is prevented from returning too quickly by the retarded snubbing action of the shock absorber 13. This particular type of shock absorber 13 can be adjusted so that the forward movement against the same in applying the brakes is damped by a predetermined adjusted resistance or damping action by the shock absorber 13 depending upon the weight of the trailer, but on the releasing of the brakes will offer a greater resistance to the movement of the plunger 38 in the operation of the trailer brake applicator.

Before the plunger 38 has completely released the trailer brakes, the plunger 21 of the applicator may leave the end of the plunnger 45 allowing the piston plunger 38 to only return as the shock absorber 13 will permit. By experience it has been found that the resistance offered by the shock absorber 13 on this return travel should be greater when releasing the brakes, than the forward movement of the piston plunger 38 in applying the brakes. There is already a shock absorber on the market having adjusting means for accomplishing this result.

By limiting the speed of movement of the brake piston 38, all forward and backward oscillations can be eliminated when applying the brakes of the trailer.

It is very important in the instant invention that the brakes on the tractor vehicle can be released without hindrance in the releasing of the trailer brakes, therefore there is no direct connection made between the plunger 21 and the plunger 45 of the actuating lever 39 on the releasing of the tractor vehicle brakes.

In the event that the trailer is disconnected from the tractor vehicle for storage or the like, a handle 60 is applied to the reduced portion of the lever 55, referring to Figure 6, and when moved in the direction of the arrow it will tighten the chain 53, pulling the actuator lever in a direction to apply the brakes of the trailer, and these brakes will be held fixed by the action of the ratchet pawl 61 engaging the dog 63.

At this time it may be advisable to thread the plug 76, referring to Figure 7, down into the valve body 70 closing the passage 77 so that the brake fluid will be locked in the brake lines, preventing them from being released. A special wrench 78 is used for this purpose.

In the event that the trailer breaks away from the tractor vehicle when in motion, the safety chain 64 will tighten the chain 53 through the lever 55, applying the brakes of the trailer, the ratchet 61 holding the brakes on. On a further pull of the safety chain 64 its end link 65 will break or separate away from the lever 55 and the action of the chain 68 will still hold the trailer in tow, but in the event the safety chain 64 would break, the brakes of the trailer will bring the same to a safe stop.

Referring to Figure 9, a modified form of trailer coupler is shown wherein a special pivotally mounted ball member 80 is attached to the draw bar 81 of the tractor vehicle. The regular trailer coupler 82 is used with this system. The plunger 21 is operated by the ball member 80 as the trailer moves forward with its momentum. By using this alternate form, the regular trailer coupler coming with the trailer can be used.

Having thus described the preferred embodiments of the invention, it should be understood that numerous other structural modifications and adaptations may be resorted to without departing from the scope of the appended claims.

What is claimed is:

1. An automatic momentum brake applicator for trailers comprising a support mounted on the forward end of said trailer, a coupling slidably mounted in said support and extending forwardly therefrom, means in said support normally biasing said coupling forwardly in said support, a hydraulic brake applicator pump mounted on said trailer rearwardly of said coupler, a lever pivoted intermediate its ends to said trailer and extending transversely thereof between said coupling and said hydraulic brake applicator pump, means on said lever engaging said coupler whereby said coupler is adapted upon movement toward said pump to move said lever on its pivot, means positively connecting said lever to said pump whereby pivotal movement of said lever will actuate said pump, a motion retarding shock absorber carried by said trailer and connected to said lever for retarding the release of the brakes, and flexible means connecting said lever to a tractor vehicle to move said lever to a brake applying position upon separation of said tractor vehicle and said trailer.

2. A device as claimed in claim 1 wherein adjustable means are provided on said coupling for engagement with said biasing means whereby the effect of said biasing means can be adjusted for varying trailer loads.

3. A device as claimed in claim 2 wherein means are provided on said support for indicating the adjusted position of said adjusting means.

4. A device as claimed in claim 1 wherein hand operated means are provided on said trailer in operative association with said flexible means whereby said lever can be moved by hand to a brake applying position.

5. An automatic momentum brake applicator for trailers comprising a support mounted on the forward end of said trailer, a coupling slidably mounted in said support and extending forwardly therefrom, a hydraulic brake applicator pump mounted on said trailer rearwardly of said coupler, a lever pivoted intermediate its ends to said trailer and extending transversely thereof between said coupling and said hydraulic brake applicator pump, means on said lever engaging said coupler whereby said coupler is adapted upon movement toward said pump to move said lever on its pivot, means positively connecting said lever to said pump whereby pivotal movement of said lever will actuate said pump, a motion retarding shock absorber carried by said trailer and connected to said lever for retarding the release of the brakes, and flexible means connecting said lever to a tractor vehicle to move said lever to a brake applying position upon separation of said tractor vehicle and said trailer.

References Cited in the file of this patent

FOREIGN PATENTS 741,712    Germany _____ Nov. 15, 1943